March 23, 1965   R. L. ROBERTS ETAL   3,174,869
FLAKED COMESTIBLES AND PROCESS FOR PREPARING SAME
Filed June 8, 1960   2 Sheets-Sheet 2
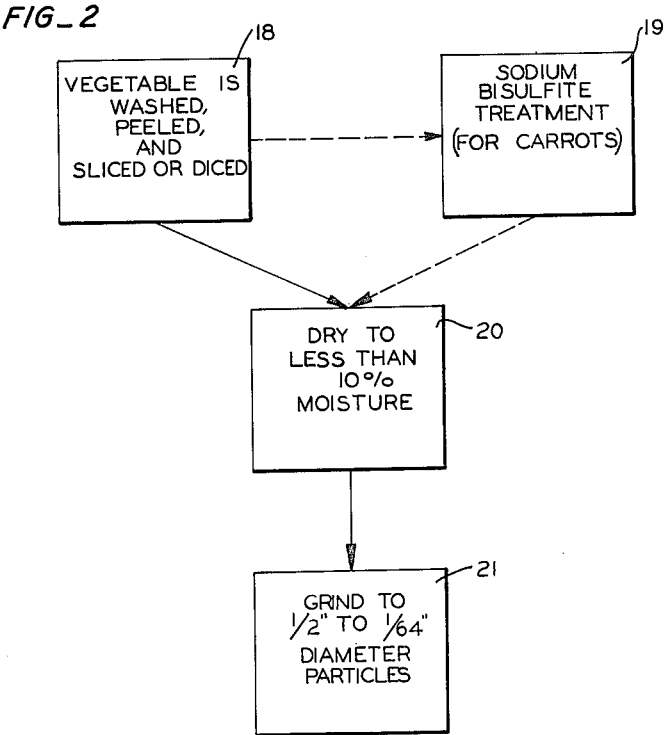
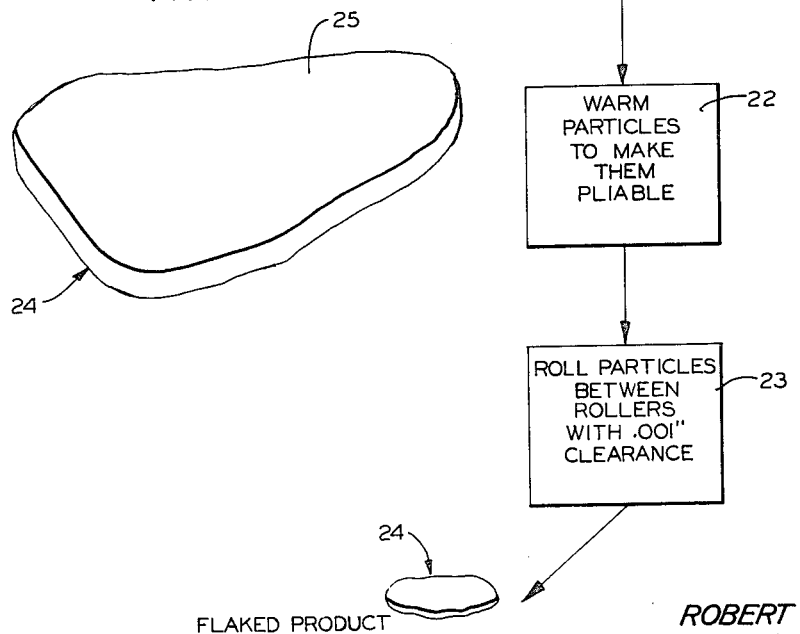
INVENTORS
ROBERT E. FAULKNER
ROBERT L. ROBERTS
ATTORNEY 3,174,869
FLAKED COMESTIBLES AND PROCESS FOR PREPARING SAME
Robert L. Roberts, Orinda, and Robert E. Faulkner, Richmond, Calif., assignors to Vacu-Dry Company, Oakland, Calif., a corporation of California
Filed June 8, 1960, Ser. No. 34,795
6 Claims. (Cl. 99—204)

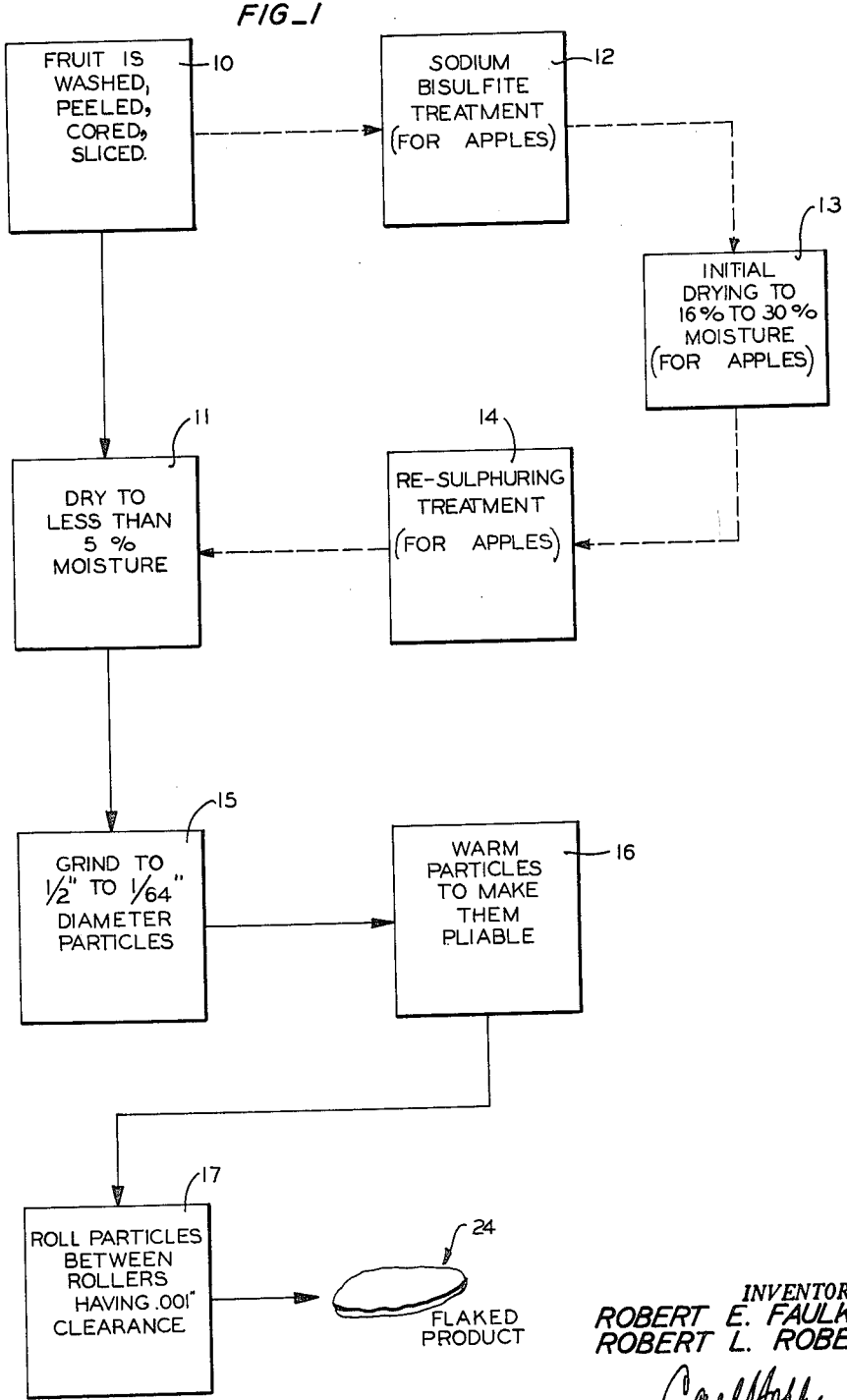

This invention relates to flaked comestibles and more particuraly to dried flaked fruits and vegetables and to a process for preparing them.

The drying of fresh fruits and vegetables to a moisture content of less than 5–10% is well-known to the art. However, the trade has experienced difficulty in obtaining low-moisture fruit and vegetable products which can be reconstituted or rehydrated quickly. In fact, some manufacturers of low-moisture foods recommend that their products be reconstituted by soaking in warm water for several hours.

One object of this invention is to provide a dried fruit or vegetable which can be reconstituted or rehydrated more quickly into a better tasting product than is presently known to the art.

Another object of this invention is to provide a dried fruit or vegetable product in a flaked form.

Still another object of this invention is to produce a compressed comestible having an easily controlled rate of rehydration.

The foregoing and other objects of this invention will become apparent from an understanding of the following description which sets forth the best mode contemplated for carrying out the present invention when considered with the accompanying drawings wherein:

FIG. 1 is a diagram of the present process for preparing dried fruit products in flaked form;

FIG. 2 is a diagram of the present process for preparing a dried vegetable product in flaked form; and FIG. 3 is a characteristic comestible flake as produced by the present process.

Referring to the diagram of FIG. 1, box 10 represents the steps of washing, peeling, coring, slicing and otherwise treating the fresh fruit by methods well-known to the art. Box 11 represents the step of drying the treated fruit to a moisture content of less than 5% by weight. Many methods for this drying step are well-known to the art such as, for example, kiln drying, vacuum drying, or conveyor belt methods. Boxes 12, 13 and 14 show additional steps commonly used in drying apples. Apples are usually treated with sodium bisulfite, as at box 12, to prevent oxidation and browning of the newly-exposed surfaces after the apples are peeled and sliced. Apples are customarily dried in two stages and box 13 represents the initial drying stage usually to a moisture content of 16% to 30%. It is common to resulphur the apples at the end of the initial drying stage to restore bisufite removed during the initial drying. Box 14 indicates this resulphuring step. After resulphuring, the apples are then dried to less than 5% moisture by methods well-known to the art, as previously described.

Referring to the diagram of FIG. 2, box 18 represents the steps of washing, peeling, slicing, dicing and otherwise treating the fresh vegetables by methods well-known to the art. Box 20 represents the step of drying the treated vegetables to a moisture content of less than 10% by weight using methods well-known to the art. Box 19 shows an additional treatment step commonly used in drying carrots by exposing them to sodium bisulfite to prevent oxidation and browning of the newly exposed surfaces after the carrots have been scraped and sliced.

All of the foregoing is well-known to the art and no claim is made herein to any novel means of drying the intermediate fruit or vegetable product to less than 5% or 10% moisture, respectively. The present invention is a novel and useful way of treating the intermediate product after it is dried to the foregoing low moisture content.

The low-moisture fruit or vegetable first is ground preferably to particle diameters ranging between ½ inch maximum and 1/64 inch minimum. However, larger particle sizes such as sliced apples for pies approximately ¼ inch thick and having 1½ square inches of top surface area may also be processed by the present method. Grinding may be done by methods well-known to the art, for example, a cutting mill such as a common corn cutter may be used with satisfactory results. Boxes 15 and 21 represent the grinding step.

After grinding the particles are warmed until they are pliable. Boxes 16 and 22 indicate this warming step in which radiant type heating has been found to be satisfactory. It is important that the particles are rendered pliable prior to performing the subseqjuent rolling step, otherwise the particles shatter and distintegrate when rolled.

After the particles are warmed, they are passed between rollers spaced .001 inch apart as indicated in boxes 17, 23. This produces a flaked product having a thickness of approximately .01 inch because the product is resilient and partially tends to assume its initial thickness. If a thicker final product is desired, the spacing between rollers is increased so that the product is within the range of .01 to .06 inch thick. Rollers of hardened steel, for example, have been successfully used, each roller measuring 15 inches in diameter and 36 inches long. The rollers rotate at about 300 r.p.m.

The final product emitted from the rollers is thinly flaked. The flakes measure approximately .01 to .06 inch in thickness and vary between ¾ inch and ¼ inch in diameter. As appears in FIG. 3, the characteristic flake 24 is generally circular or somewhat elliptical in shape and has generally continuous and unbroken top and bottom surfaces 25. The flakes have a compressed but unruptured cellular structure which during rehydration rapidly resumes its original size and shape.

It has been observed that generally spherical particles screened through 8 mesh screen average about 1/10 inch in average diameter and usually flake out to a size slightly under ¼ inch. Generally cubical particles have also been processed having average dimensions of ⅛ x ⅛ x ⅛ inch and flaking out to about ¼ x ¼ x 1/100 inch. Particles measuring approximately ⅛ x ⅛ x ⅜ inch usually flake out to about ½ x ¾ x 1/100 inch.

The flaked product rehydrates much more rapidly than similar products known to the art. Moreover, the rehydration rate of the flake described herein is easily controlled merely by controlling the thickness of the final product. The thinness of the flake cross-sections together with their compressed but unruptured cellular structure contribute to a rapid rate of rehydration, not heretofore possible in this art.

The final products resemble cereals of the rolled oat type and, when mixed with such cereals or other dried cereals, produce an attractive breakfast food. The thinness of the flaked product induces quick rehydration or reconstitution upon addition of liquids. For example, pouring milk over fruit flakes mixed with dried cereal flakes rehydrates the fruit flakes in a few minutes, bringing out the fresh fruit flavor and resulting in a tasty, appetizing breakfast dish. Fruit and vegetable flakes also can be mixed into a variety of other dishes to produce an attractive, novel food which, upon the addition of liquid, instantly releases its natural flavor.

The foregoing detailed description of the present invention has been given for clearness of understanding only and no unnecessary limitation should be understood therefrom for modifications will be obvious to those skilled in the art.

We claim:

1. A process for preparing a flake product from a dried comestible having a moisture content of less than 10% by weight which comprises the step of grinding said dried comestible into particles, warming said particles until they become pliable, and then rolling said particles into flakes, having a compressed but unbroken cellular structure.

2. A process for preparing a flake product from a dried comestible having a moisture content of less than 10% by weight which comprises the step of grinding said dried comestible into particles, warming said particles until they become pliable, and then rolling said particles into flakes having thicknesses within the range of 0.01 to 0.06 inch and having a compressed but unbroken cellular structure.

3. A process of preparing a fruit flake product from dried fruit having a moisture content of less than 5% by weight which comprises the step of grinding said dried fruit into particles, warming said particles until they become pliable, and then rolling said particles into a fruit flake having a compressed but unbroken cellular structure.

4. A process of preparing a fruit flake product from dried fruit having a moisture content of less than 5% by weight which comprises the step of grinding said dried fruit into particles, warming said particles until they become pliable, and then rolling said particles into a fruit flake having a thickness within the range of 0.01 to 0.06 inch and having a compressed but unbroken cellular structure.

5. A process of preparing a vegetable flake product from dried vegetables having a moisture content of less than 10% by weight which comprises the step of grinding said dried vegetables into particles, warming said particles until the become pliable, and then rolling said particles into flakes having a compressed but unbroken cellular structure.

6. A process of preparing a vegetable flake product from dried vegetables having a moisture content of less than 10% by weight which comprises the step of grinding said dried vegetables into particles, warming said particles until the become pliable, and then rolling said particles into flakes having thicknesses within the range of 0.01 to 0.06 inch and having a compressed but unbroken cellular structure.

References Cited in the file of this patent

UNITED STATES PATENTS

| | | |
|---|---|---|
| Re. 22,522 | Krause | July 25, 1944 |
| 2,901,359 | Forkner | Aug. 25, 1959 |